(12) United States Patent
Inoue et al.

(10) Patent No.: US 8,409,017 B2
(45) Date of Patent: Apr. 2, 2013

(54) PROGRAM, AND MOBILE COMMUNICATION TERMINAL

(75) Inventors: Mikio Inoue, Tokyo (JP); Norioki Watanabe, Tokyo (JP); Junko Osawa, Tokyo (JP)

(73) Assignee: Vodafone Group PLC, Newbury, Berkshire (GB)

(*) Notice: Subject to any disclaimer, the term of this patent is extended or adjusted under 35 U.S.C. 154(b) by 1201 days.

(21) Appl. No.: 12/007,036

(22) Filed: Jan. 4, 2008

(65) Prior Publication Data

US 2008/0146350 A1 Jun. 19, 2008

Related U.S. Application Data

(63) Continuation of application No. PCT/JP2006/313504, filed on Jul. 6, 2006.

(30) Foreign Application Priority Data

Jul. 12, 2005 (JP) .................................. 2005-202502

(51) Int. Cl.
*A63F 13/00* (2006.01)

(52) U.S. Cl. ............... 463/43; 463/16; 463/20; 463/24; 463/39; 463/42

(58) Field of Classification Search .............. 463/16, 463/20, 24, 39, 42, 43
See application file for complete search history.

(56) References Cited

U.S. PATENT DOCUMENTS

| | | | |
|---|---|---|---|
| 6,527,641 B1* | 3/2003 | Sinclair et al. | 463/39 |
| 6,908,389 B1* | 6/2005 | Puskala | 463/40 |
| 7,577,847 B2* | 8/2009 | Nguyen et al. | 713/186 |
| 7,699,703 B2* | 4/2010 | Muir et al. | 463/29 |
| 7,867,085 B2* | 1/2011 | Pryzby et al. | 463/30 |
| 7,883,417 B2* | 2/2011 | Bruzzese et al. | 463/39 |
| 2005/0270423 A1 | 12/2005 | Matsunaga | |
| 2006/0117105 A1 | 6/2006 | Lesenne et al. | |
| 2010/0099499 A1* | 4/2010 | Amaitis et al. | 463/42 |
| 2010/0113135 A1* | 5/2010 | Asher et al. | 463/20 |
| 2010/0167809 A1* | 7/2010 | Perlman et al. | 463/24 |

FOREIGN PATENT DOCUMENTS

| | | |
|---|---|---|
| GB | 2359450 A | 8/2001 |
| JP | 2002-041423 | 2/2002 |
| JP | 2002-292148 | 10/2002 |
| JP | 2002-330419 | 11/2002 |
| JP | 2006-512689 | 4/2006 |
| WO | WO 2004/019210 A1 | 3/2004 |
| WO | WO 2004/066144 A2 | 8/2004 |

OTHER PUBLICATIONS

Supplementary European Search Report dated Nov. 23, 2010.

* cited by examiner

*Primary Examiner* — Pierre Eddy Elisca
*Assistant Examiner* — Shahid Kamal
(74) *Attorney, Agent, or Firm* — Kratz, Quintos & Hanson, LLP (57) ABSTRACT

A branching tree program replays audio data, and thereafter, when the user performs a selection of alternatives, the branching tree program replays audio data in the branching tree which is the target of selection. The branching tree program progresses a game by repeating this type of selection and replaying. If the end of the branching tree is reached, or if the next item of audio data is not stored upon the portable telephone, then the required data or program is downloaded from a server device 50, and the game is continued. Accordingly, along with it being possible to progress the story of the game by simple actuation, also it is possible to economize upon the storage space, and moreover it is possible to utilize story data without changing the program. As a result, along with it being possible to progress the story of the game by simple actuation, also it is possible to economize upon the storage space, and moreover it is possible to utilize story data without changing the program.

1 Claim, 8 Drawing Sheets

| File Name A | Audio A Data |
|---|---|
| File Name B | Audio B Data |
| File Name C | Audio C Data |
| File Name D | Audio D Data |
| File Name E | Audio E Data |

| File Name A | Audio G Data |
|---|---|
| File Name C | Audio H Data |
| File Name E | Audio I Data |

Fig. 8

| File Name A | Audio G Data |
|---|---|
| File Name B | Audio B Data |
| File Name C | Audio H Data |
| File Name D | Audio D Data |
| File Name E | Audio I Data |

PROGRAM, AND MOBILE COMMUNICATION TERMINAL

RELATED APPLICATION

This is a continuation application of the international patent application No. PCT/JP2006/313504 filed with Application date: Jul. 6, 2006. The present application is based on, and claims priority from, J.P. Application 2005-202502, filed on Jul. 12, 2005, the disclosure of which is hereby incorporated by reference herein its entirety.

BACKGROUND OF THE INVENTION

The present invention relates to a program and to a mobile communication terminal, and more particularly relates to a program for a game which utilizes display or replay of images, audio, documents, or the like, and to a mobile communication terminal which uses this program.

BACKGROUND ART

In recent years, with the progression of communication technique, mobile communication terminals have been implemented in practice which are endowed with various kinds of functions, i.e. not only with the functions of telephone conversation and email, but also with the capability of downloading games and being utilized as gaming machines, and so on. This type of gaming function is a high-functioning gaming function which can handle images and 3D sound audio of high quality, since, due to the progression in recent years of CPUs (Central Processing Units) and the like, they have become capable of handling large volumes of data.

SUMMARY OF THE INVENTION

The high-functioning gaming function described above and the like is extremely excellent from the aspect that it is possible to enjoy images and audio of high quality. However, there has been the problem that, from the point of view of the user, it becomes complicated to perform actuation in order to progress in the game. Furthermore, since it is necessary to download a data file for the game whose size has become very great, a greater communication cost and communication time are required than in the prior art. Moreover, since it is necessary to provide a storage region for storing the program for the game, there has been a problem in handling data of high volume such as that for a game upon a mobile communication terminal, whose memory resources are small.

The present invention has been conceived in the light of the circumstances described above, and it takes as its first objective to be able to progress through a game with simple actuation, and as its second objective to provide a program and a mobile communication terminal which can manage with using a small storage region, by storing upon the device which is executing the game only the information which is needed according to the state of progression through the game.

The program of the present invention is a program which is included in a game application executed upon a mobile communication terminal, and which controls the deployment of data files in said game application upon said mobile communication device by selection of alternatives via an input device, and which executes upon a processing device: a choice selection wait step of waiting until a selection of alternatives via said input device is detected; a deployment sequence determination step of, when a selection of said alternatives has been detected, determining a sequence of deployment of said data files in said game application by establishing a correspondence between identifiers of data files which are stored separately from said mobile communication terminal itself, and said selected choice; and a deployment command step of commanding the deployment by said mobile communication terminal of said data files which are stored separately by themselves.

Here, "input device" is to be taken to include a device for performing key input, audio input, or any other type of input to the mobile communication terminal, and processing for "waiting" is to be taken to include any processing implemented by looping or interrupt or the like. Moreover although, in order to wait for actuation by the user upon the input device, first the user is invited to select between certain alternatives, it would be acceptable for this invitation to select between alternatives to be performed by said program, or to be performed by some other program or the like. Furthermore it is supposed that the term "data file" includes data for characters, audio, still images, and moving images which are required for the execution of the game application. Moreover, the term "deployment" includes displaying of characters and still images which are the contents in data files, and replaying of audio and moving images which are the contents of data files. Yet further, storage "separately by themselves" means that, since the data files which are used in the game application are independent data and are separate from the program, accordingly it is possible to obtain different data files by downloading or via a memory card or the like, and, even if the data files which are first stored are overwritten or added to, it is still possible for the program to progress using these new data files. And "establishing a correspondence" is setting up a correspondence, by a control routine within the program, between alternatives for selection, and identifiers which are assigned in advance to data files which are deployed in the game application. With some typical types of game application, the control routine is organized so that the story progresses by repeated selection from alternatives, with which data files are to be deployed being determined by that control routine according to the selected alternative. For example, the contents of the same data file is not necessarily deployed even if the same option is chosen; rather, the appropriate data file to be deployed next is selected by the control routine as the story is branched. As an example of such a control routine, one like a tree program is well known.

While "determining a sequence of deployment" is, in the same manner by the control routine, determination of the order of deployment of data files which correspond to the alternatives of a first selection, it does not necessarily mean exclusive deployment. It does not exclude the possibility that, during the execution of the game application, deployment of a plurality of data files may be performed.

Here, this program may be implemented as a general purpose type program in so called JAVA (registered trademark) or the like, or may be implemented as a program which is installed upon the mobile communication terminal. Moreover, it may be arranged for the program and the data files to be installed upon the mobile communication terminal from the beginning, or it may be arranged for the program and the data files to be stored upon the mobile communication terminal, after purchase by the user, by being downloaded either simultaneously or separately.

Thus, according to this program, it is possible to perform deployment of the next data files by a simple actuation, in other words by a selection between alternatives, so that, by it being possible to progress the story of the game only by substituting the data files, along with it being possible to economize upon the storage space which is used in the mobile communication terminal, it is also possible to utilize the data files which have been substituted, without changing the program.

Furthermore, with the program of the present invention, before said choice selection wait step, a predetermined data deployment command step may further be executed by said processing device, in which a predetermined identifier is designated, and deployment is commanded of a data file which corresponds to said predetermined identifier.

Furthermore, with the program of the present invention, said choice selection wait step and said deployment command step may be repeated twice or more, and, in said choice selection wait step, at the second time and subsequently, said selection branch for selection of alternatives may be determined based upon said selection of alternatives which was notified during the deployment command step which was performed before said choice selection wait step at the second time and subsequently. Accordingly, the user is able to progress through the game by repeating the selection of alternatives.

Furthermore, with the program of the present invention, a further download step of downloading said data file from a server device which is connected to a communication network may be executed by said processing device. Moreover, with the program of the present invention, said data file which is downloaded may be determined based upon said selection of alternatives which was notified in said deployment command step.

In other words it is possible to progress the story of the game further, simply by downloading and substituting only those data files which have become necessary according to the state of progression of the game. Accordingly by storing, upon the mobile communication terminal which is executing the program, only those data files which are necessary, along with it being possible to reduce the burden of the cost and time for downloading the data files, it is also possible to economize upon the storage space within the mobile communication terminal.

Moreover, with the program of the present invention, may be taken as a program as described in claim 1, characterized in that story data which has been prepared in correspondence to the progression of the story of a game is included in said data file.

The mobile communication terminal of the present invention is a mobile communication terminal upon which are stored a program according to the present invention, and a data file which is deployed by said program. Accordingly, by using the program of the present invention upon a mobile communication terminal, which is limited with regard to its amount of storage and its communication speed, along with it being possible to reduce the burden of the cost and time for downloading, it is also possible to economize upon the storage space within the mobile communication terminal, so that it is possible to make effective use thereof.

As has been explained, above, according to the program and the mobile communication terminal of the present invention, it is possible to deploy the next data file by a simple actuation consisting of selection between alternatives, so that it is possible to progress the story of the game by only substituting the data file. Due to this, along with it being possible to economize upon the storage region, the advantageous effect is also obtained that it is possible to utilize the data files which have been substituted, without changing the program.

DETAILED DESCRIPTION

In the following, an embodiment of the present invention will be explained with reference to FIGS. 1 through 11. It should be understood that, in these figures, the same reference symbols are appended to elements which are the same or equivalent, and duplicated explanation will be omitted.

Figure 1:
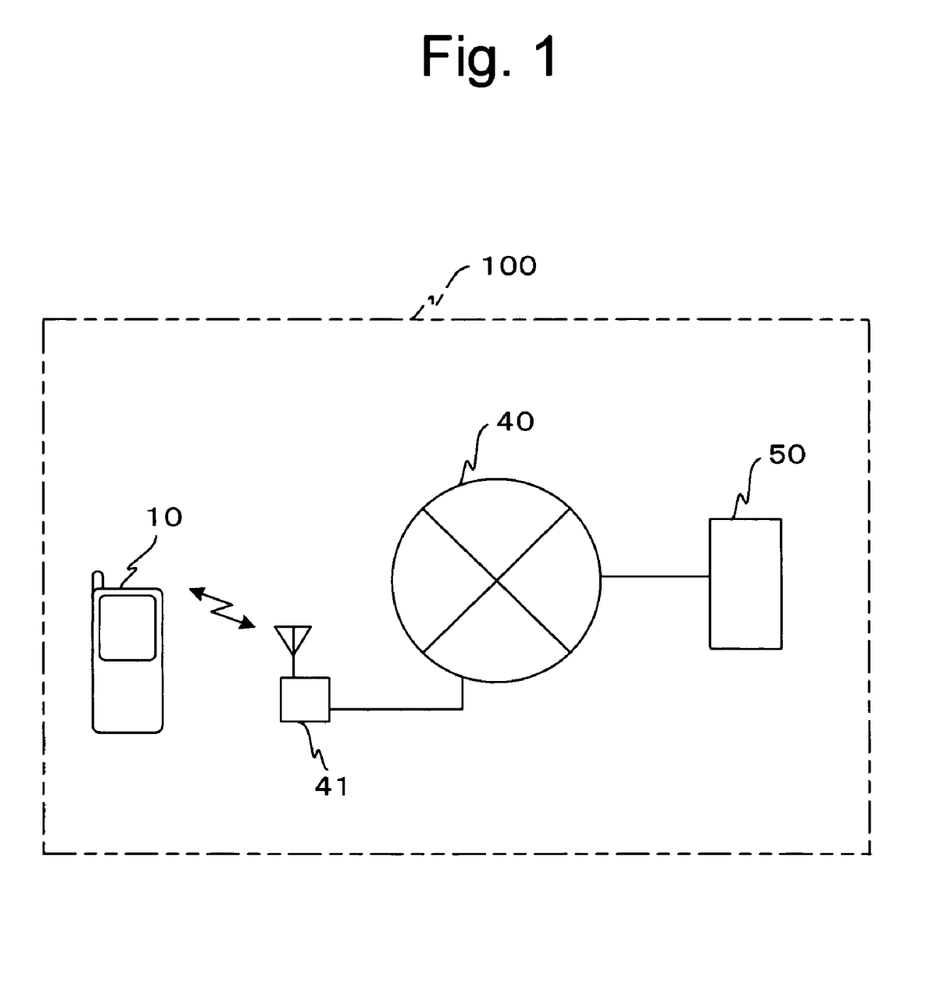
FIG. 1 is a figure schematically showing a mobile communication system 100 which is an embodiment of the present invention.

In FIG. 1, the structure of a mobile communication system 100 which is an embodiment of the present invention is schematically shown. As shown in FIG. 1, this mobile communication system 100 comprises: (a) a portable telephone 10, which is a mobile communication device; (b) a base station 41 with which the portable telephone 10 performs direct wireless communication; (c) a mobile communication net 40 which is connected to the base station 41; and (d) a server device 50 which is connected to the mobile communication net 40.

Figure 2A:
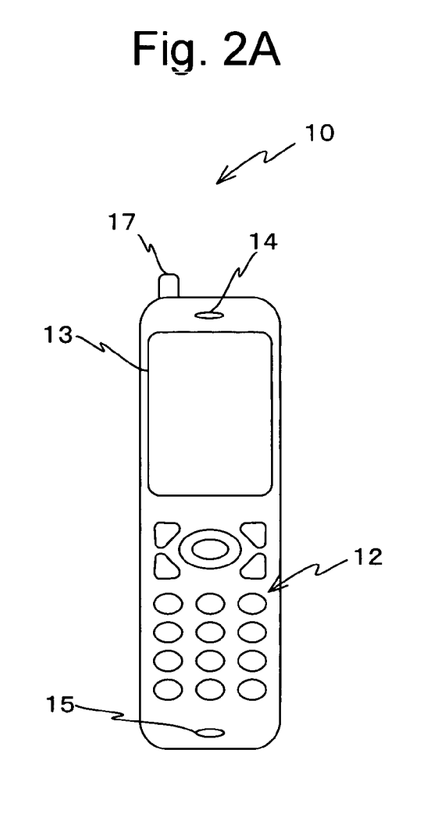
FIG. 2A is an elevation view schematically showing the external appearance of a portable telephone 10.
Figure 2B:
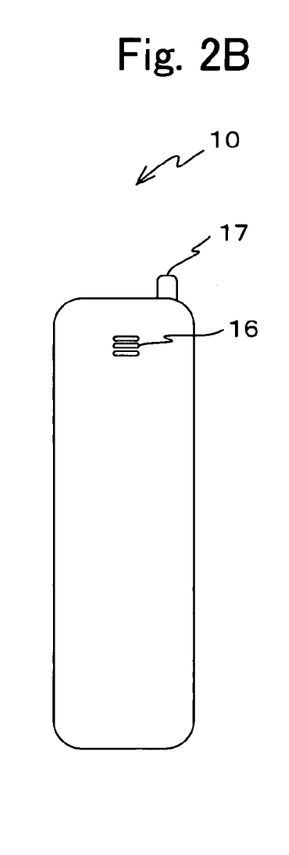
FIG. 2B is a rear view schematically showing the external appearance of this portable telephone 10.

The external appearance of the portable telephone 10 is schematically shown in FIG. 2A and FIG. 2B. As shown in FIG. 2A and FIG. 2B, this portable telephone 10 comprises: (i) an actuation unit 12 which comprises a tenkey pad for inputting telephone numbers and function keys for inputting various types of command such as changeover of operational modes and the like; a display unit 13 comprising a liquid crystal display unit which displays actuation guidance for the portable telephone 10, its operational state, and so on; (iii) a speaker for telephone conversation 14 which replays audio signals which, during a telephone conversation, have arrived from the opposite party; (iv) a microphone for inputting sound during capture, and for inputting audio during a telephone conversation; (v) a speaker for guidance 16 which generates ring tones and guidance sounds; and (vi) an antenna 17 for performing wireless communication with the base station 41.

Figure 3A:
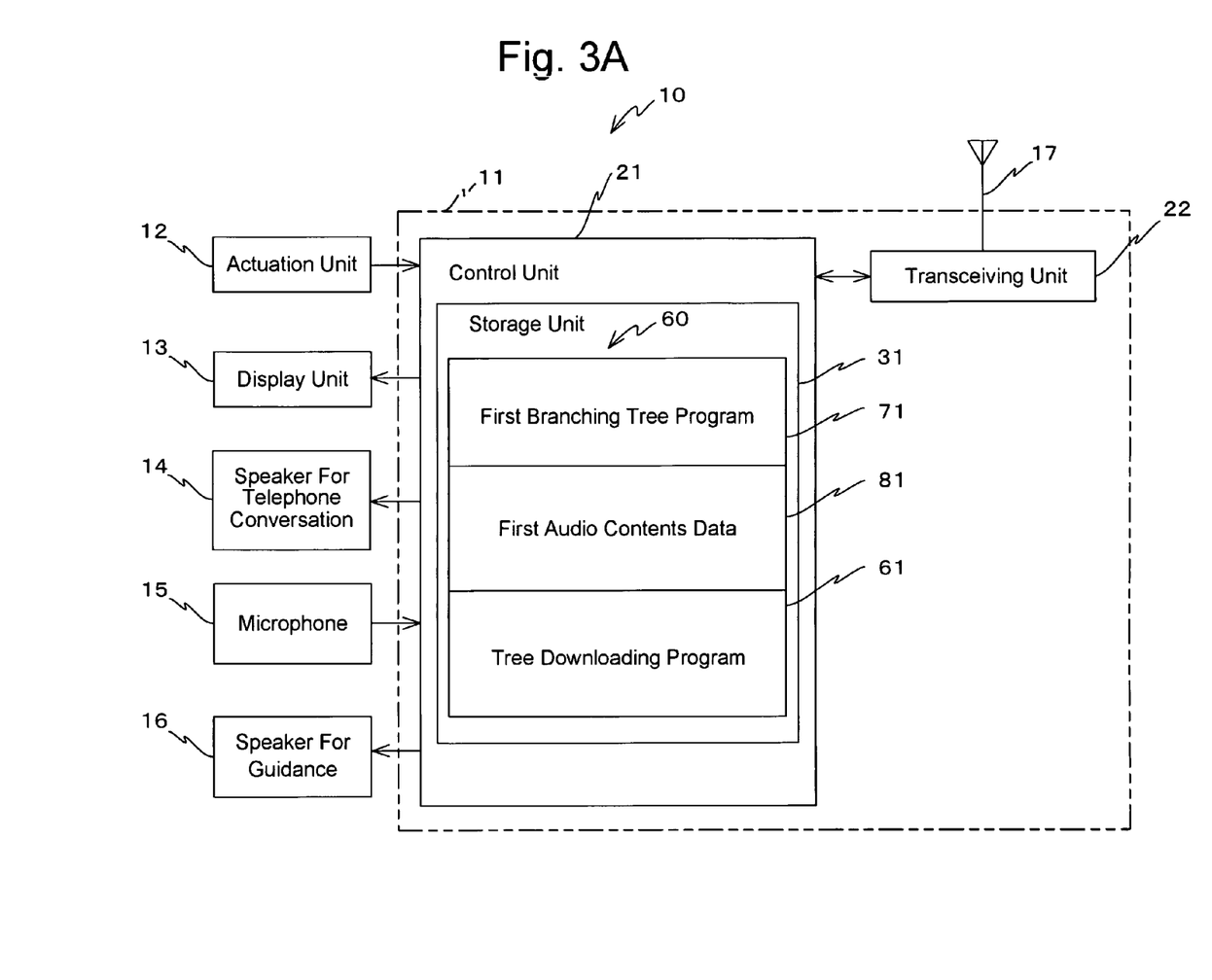
FIG. 3 is a figure schematically showing the internal system 11 of the portable telephone 10 of FIG. 1.

An internal system 11, which is an information processing system internal to the portable telephone 10, is schematically shown in FIG. 3. This internal system 11 comprises a control unit 21 which controls the entire system of the portable telephone 10 as a whole, and a transceiving unit 22 which performs wireless communication with the base station 41 via the antenna 17. Here, the control unit 21 comprises a storage unit 31 which is made from non-volatile and volatile storage devices, and in this non-volatile storage device there is stored a game application 60, which is an application for a game of which the story progresses by the user making various alternative selections, and by replaying audio data files.

This game application 60 comprises: (a) a first branching tree program 71, which is one of a number of branching tree programs designated by the names of audio files which are replayed, according to the state of progression of the game; (b) first audio contents data 81, which is audio contents data in which are stored a plurality of audio files which are replayed according to commands in the first branching tree program 71; and (c) a tree downloading program 61, which is a program which downloads a branching tree program, or both a branching tree program and audio data, according to the state of progression of the game. Here, the program of the game application 60 is described in a language which does not depend upon the terminal of the portable telephone, but may be used in a general purpose manner, such as so called JAVA (registered trademark) or the like.

Figure 4:
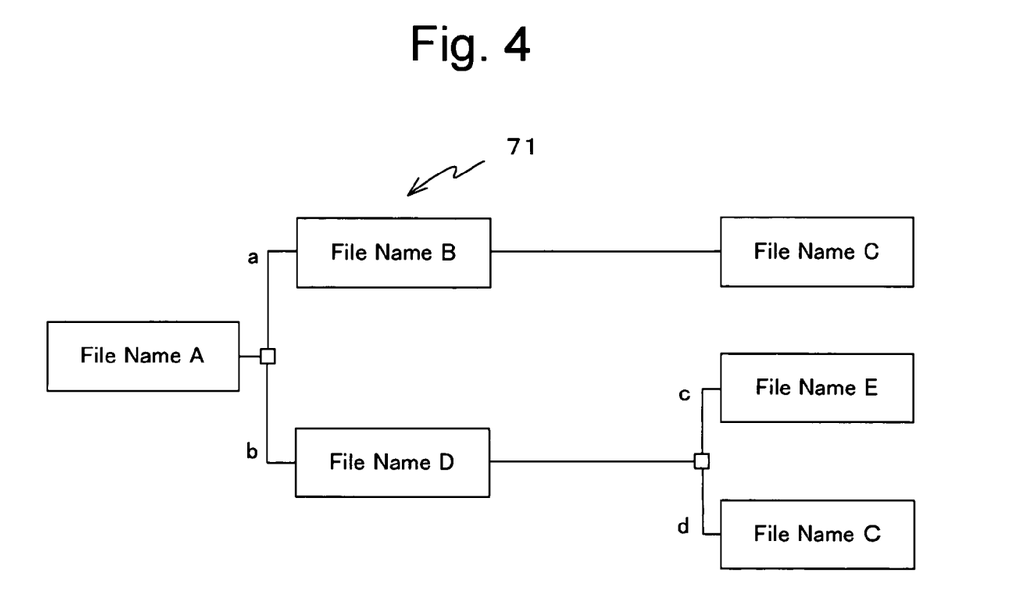
FIG. 4 is a figure showing a branching tree of a first branching tree program 71 of FIG. 3.

The first branching tree program 71 is a program as shown in the branching tree of FIG. 4. In this program, first, a file name A is designated and its audio is replayed, and thereafter the user is made to select a or b. If the user has selected a, then a file name B is designated and is replayed, and after this replay has ended, a file name C is designated and is replayed. On the other hand, if the user has selected b, then a file name D is designated and is replayed, and thereafter the user is made to select c or d. If the user has selected c, then a file name E is designated and is replayed, while if the user has selected d, then the file name C is designated and is replayed, in a manner similar to when a was selected. Here, the file which is designated is replayed using the speaker for telephone conversation 14, and the selection by the user is performed by his pressing a key of the actuation unit 12 once.

Figure 5:
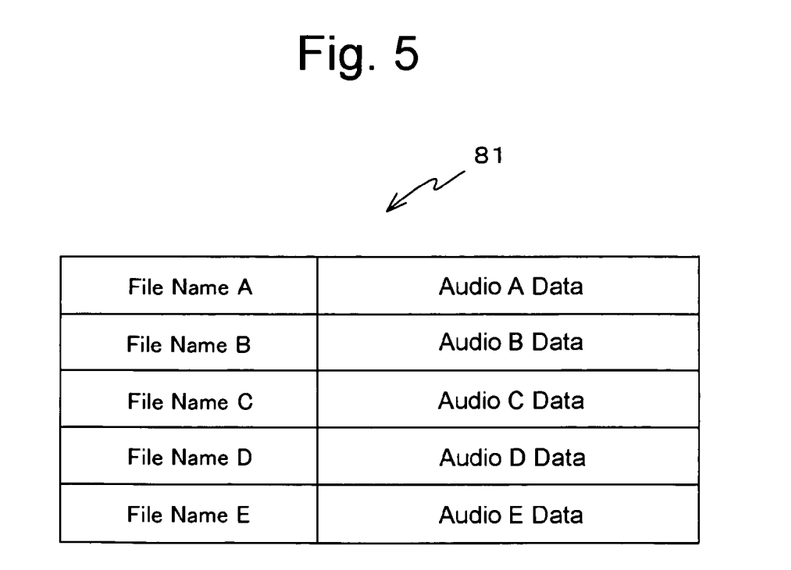
FIG. 5 is a figure showing the structure of first audio contents data 81 of FIG. 3.

Furthermore, as shown in FIG. 5, first audio contents data 81 is stored as a group of audio contents made up from audio data A corresponding to the file name A, through audio data E corresponding to the file name E.

Next, the processing when the user is running the game application 60 will be explained. When the user starts the game application 60, in a step S11 of FIG. 6, the first branching tree program 71 is executed. In this first branching tree program 71 of the step S11, as previously described, first the audio data A which corresponds to the file name A is replayed. At the end of the audio data A, a message which invites the user to select one of a and b is replayed, and the user selects a or b by pressing a key of the actuation unit 12. Here, when the user selects b, then the audio data D which corresponds to the file name D is replayed, and when the audio data D is finished, a message which invites the user to select one of c and d is replayed. Furthermore, if the user has selected c, then the audio data E which corresponds to the file name E is replayed, and, at the end of the audio data E, a message is replayed which invites the user to download data for audio contents in order to continue the game. Here, whether the selection of the user be a or d, in each case, at the end of the audio data C which corresponds to the file name C, a similar message which invites the user to download data for audio contents in order to continue the game is replayed. Moreover, since the branching tree used in the story of the game which continues after the audio data E is the same as the branching tree of this first branching tree program, accordingly no new download of any program for a branching tree is performed, but only downloading of the audio data is performed.

Figure 6:
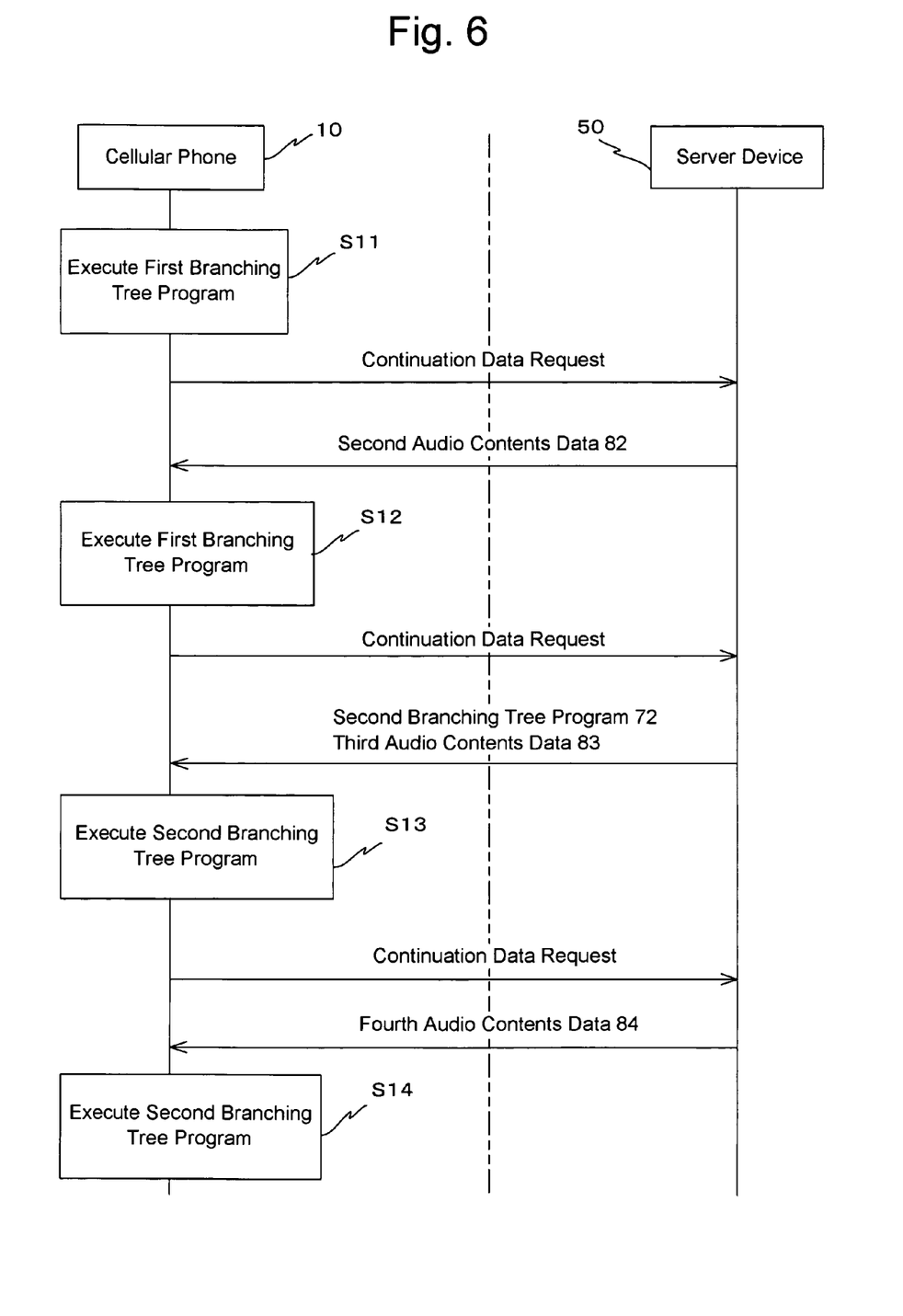
FIG. 6 is a sequence diagram showing the state of communication between the portable telephone device 10, when it is executing a game application 60 of FIG. 3, and a server device 50.
Figure 7:
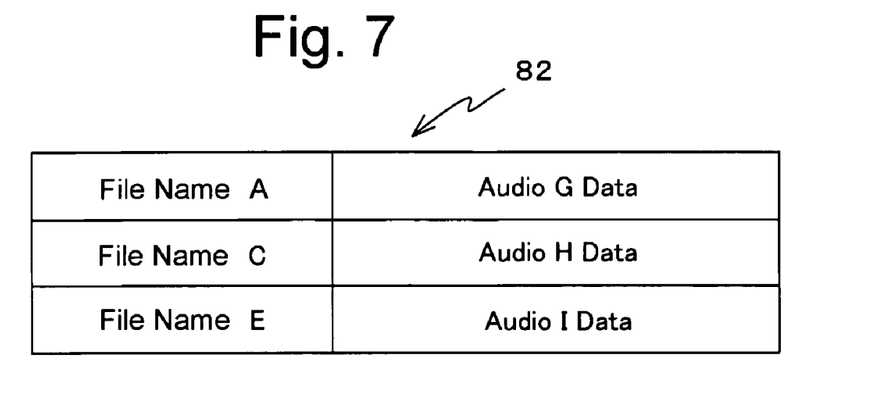
FIG. 7 is a figure showing the structure of second audio contents data 82 of FIG. 6.

The user actuates keys of the actuation unit 12 according to commands in the audio messages which are replayed, and, when he requests the download of data of audio contents in order to continue the game, the first branching tree program 71 transmits this request to the server device 50 of FIG. 3 via the transceiving unit 22 and the antenna 17. This request which has been transmitted is notified, as shown in FIG. 6, to the server device 50 via the base station 41 and the mobile communication net 40; and, upon receipt of this request, the server device 50 transmits to the portable telephone 10 the second audio contents data 82, which is audio contents carrying on from the audio data E. And the second audio contents data 82 is received by the portable telephone 10, after it has pursued in reverse the same path as the transmission of the request. Here, as shown in FIG. 7, the second audio contents data 82 is the audio data G, the audio data H, and the audio data I, which respectively correspond to the file name A, the file name C, and the file name E.

Figure 8:
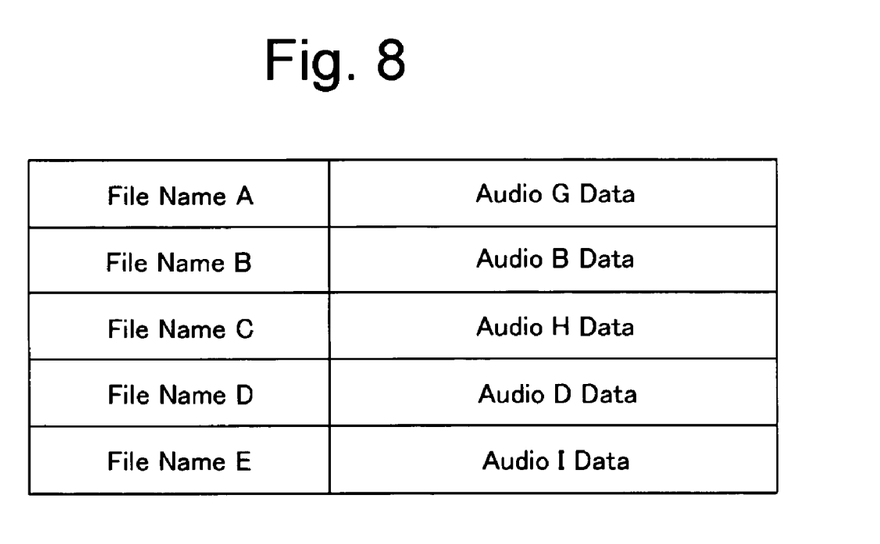
FIG. 8 is a figure showing the structure of audio contents data which is stored in the portable telephone device 10, after the second audio contents data 82 of FIG. 6 has been downloaded.

Upon receipt of this second audio contents data 82, the first branching tree program 71 replaces the file names which are included in the second audio contents data 82 with the audio data items corresponding thereto. In other words, the audio data G is replaced by the audio data A which corresponds to the file name A, the audio data H is replaced by the audio data C which corresponds to the file name C, and the audio data I is replaced by the audio data E which corresponds to the file name E. Here, the audio data B and the audio data D which are not replaced are used just as they are by the first branching tree program 71. An illustration after the replacement is shown in FIG. 8.

The first branching tree program 71 in which these audio data items have been replaced is executed for a second time, in the step S12 of FIG. 6, from the first tree branch. Here, the audio data which is initially replayed is the audio data G which was in correspondence with the file name A. This processing in the step S12 is the same as the processing of the first branching tree program 71 described above, but, as shown in FIG. 8, in relation to the file name A, the file name C, and the file name E, the audio data which is replayed is the audio data G, the audio data H, and the audio data I which have replaced them, respectively.

Here, if in the branching tree of FIG. 4 the user performs selection of b and d, then the first branching tree program 71 replays in order the audio data D and the audio data H, which respectively correspond to the file name D and the file name C. Here, at the end of replay of the audio data H, in the same manner as the previously described case, a similar message is replayed which invites the user to download data consisting of a branching tree program and audio contents for continuing the game. It should be understood that, even if this first branching tree program 71 ends with the replaying of the audio data I which corresponds to the file name E, a similar message which invites the user to download data consisting of a branching tree program and audio contents for continuing the game is still replayed.

According to the commands in this audio message, the user actuates the keys of the actuation unit 12, and, when he requests the download of data consisting of a branching tree program and audio contents for continuing the game, the execution of the tree downloading program 61 is started, and the first branching tree program 71 ends. The tree downloading program 61 whose execution has started transmits to the server device 50, via the same path as that previously described, a request for download of data consisting of a branching tree program and audio contents. Upon receipt of this request, the server device 50 transmits to the portable telephone 10 third audio contents data 83, which is data consisting of a second branching tree program 72, being a branching tree program for the game continuing on from the audio data H, and audio contents. And this data and program which have been transmitted are received by the portable telephone 10.

Figure 9:
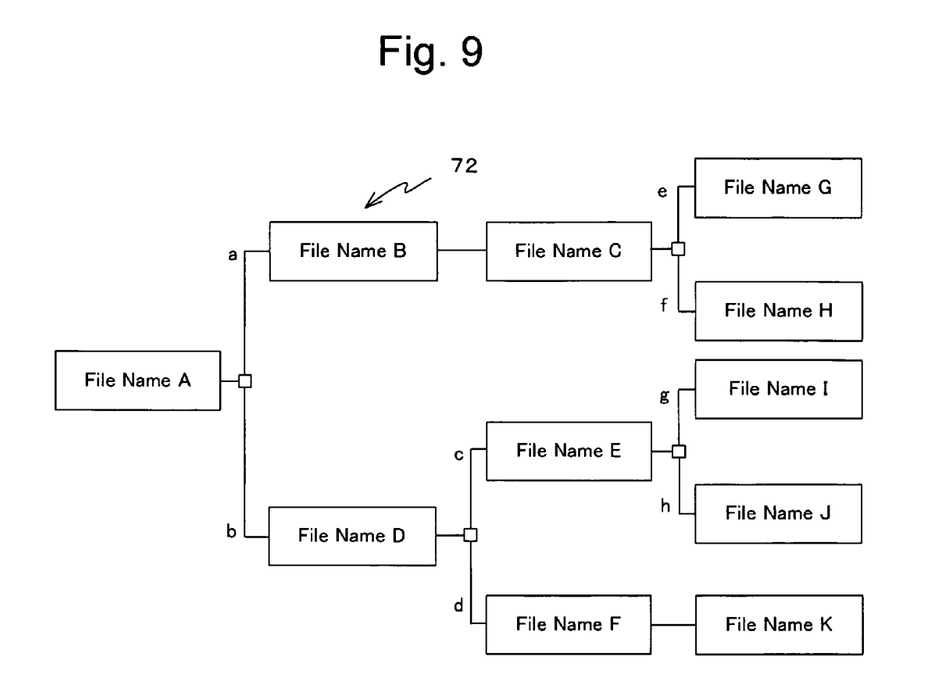
FIG. 9 is a figure showing a branching tree of a second branching tree program 72 of FIG. 6.

Here, the second branching tree program 72 is a program like the branching tree figure shown in FIG. 9. In this program, the structure from the file name A through the file name E is the same as that of the first branching tree program 71 of FIG. 4. The points of difference are that, if d is selected, then the file name F is designated and replayed, and that, after the files named C, E, and F have been designated and replayed, then further files for being replayed are designated. In concrete terms, in this second branching tree program 72, after the file name C has been designated and replayed, then the user is further made to select e or f, and if the user has selected e then the file name G is designated and replayed, while if the user has selected f then the file name H is selected and replayed. Moreover, after the file name E has been designated and replayed, then the user is further made to select g or h, and if the user has selected g then the file name I is designated and replayed, while if the user has selected h then the file name J is selected and replayed. And if the user has selected d, then the file name F is designated and replayed, and then the file name K is designated and replayed.

Figure 10:
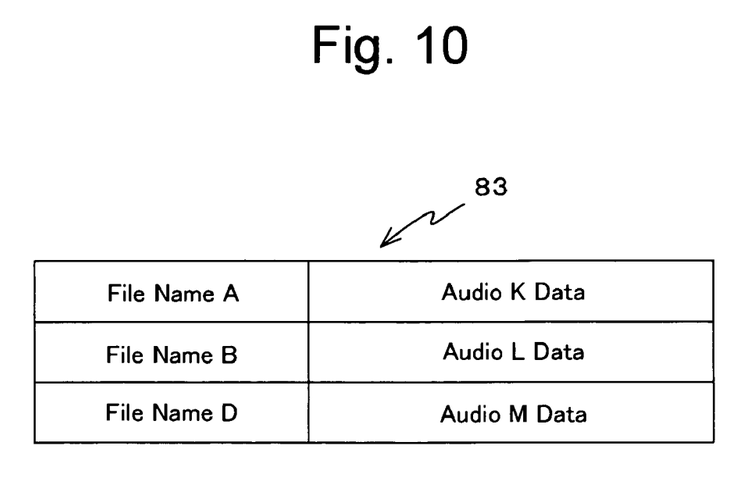
FIG. 10 is a figure showing the structure of third audio contents data 83 of FIG. 6.

Furthermore, as shown in FIG. 10, the third audio contents data 83 is the audio data K, the audio data L, and the audio data M, which respectively correspond to the file name A, the file name B, and the file name D. When the tree downloading program 61 has received the second branching tree program 72 and the third audio contents data 83, it deletes the first branching tree program 71 and the second audio contents data 82, and stores the second branching tree program 72 and the third audio contents data 83. Thereafter, in the step S13 of FIG. 6, the second branching tree program 72 which has been stored is executed.

In this second branching tree program 72, as shown in FIG. 9, first the audio data K which corresponds to the file name A is replayed. At the end of the audio data K, a message which invites the user to select one of a and b is replayed, and the user selects a or b by pressing a key of the actuation unit 12. Here, when the user selects b, then the audio data M which corresponds to the file name D is replayed, and when the audio data M is finished, a message which invites the user to select one of c and d is replayed. Here, if the user has further selected c, then a message is replayed which invites the user to download data for audio contents in order to continue the game. It should be understood that, if any other selection is performed, then a similar message is replayed.

Figure 11:
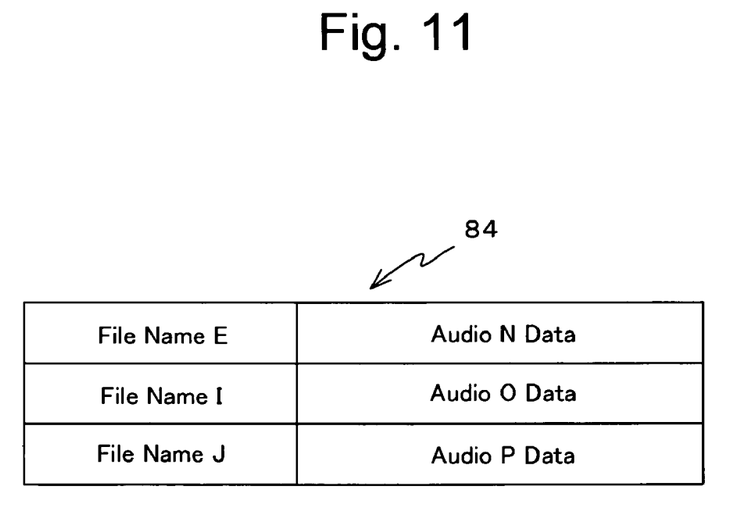
FIG. 11 is a figure showing the structure of fourth audio contents data 84 of FIG. 6.

According to the commands in this audio message, the user actuates the keys of the actuation unit 12, and, when he requests the download of data consisting of a branching tree program and audio contents for continuing the game, the second branching tree program 72 transmits this request to the server device 50 via the same path as previously described. Upon receipt of this request, the server device 50 transmits to the portable telephone 10 fourth audio contents data 84, which is data consisting of audio contents for the game to continue on from the audio data M. And this fourth audio contents which has been transmitted is received by the portable telephone 10. Here, as shown in FIG. 11, this fourth audio contents data 84 is the audio data N, the audio data O, and the audio data P, which respectively correspond to the file name E, the file name I, and the file name J.

When the second tree branching program 72 has received the fourth audio contents data 84, it deletes the third audio contents data 83, and stores the fourth audio contents data 84. And, having stored the audio contents data, in the step S14 of FIG. 6, the second branching tree program 72 resumes the processing from the position of the file name E, which is the continuation of the branching tree of FIG. 9. When the audio data N which corresponds to the file name E has been replayed, at the end of the audio data N, a message is replayed which invites the user to select g or h in FIG. 9, and the user selects g or h by pressing any one of the keys on the actuation unit 12. Here, if the user selects g, then the audio data O which corresponds to the file name I is replayed, and when the replaying of this audio data O ends, then the game story which was started by the first branching tree program 71 replaying the audio data A ends. Moreover, if the user has selected h, then the audio data P which corresponds to the file name J is replayed, and when the replaying of this audio data P ends, then said game story ends.

Here, although this game story has ended, the user is able further to enjoy another game with a different story, by downloading data consisting of another branching tree program and audio contents, using the tree downloading program 61.

As has been explained above, in this embodiment, when the user executes the game application 60 which is stored upon the portable telephone 10, the first branching tree program 71 is started, the audio data A which corresponds to the file name A is replayed, and the game is started. The game is performed by replaying the audio data corresponding to the file names which are specified in the branching tree, and, at the end of each item of audio data, a message is replayed which invites the user to select from alternatives. And the user makes his selection from the alternatives, the branching tree program further replays the audio data item which corresponds to the file name designated in the tree branch targeted by this selection, and the game progresses by this processing for replaying and selection being repeated.

When the first branching tree program 71 reaches the end of the branching tree, then the user is invited to download data consisting of new audio contents, and when the user performs actuation, the second contents data 82 is downloaded, and the first branching tree program 71 is executed for a second time using this second audio contents data 82. Next, when the processing of the first branching tree program 71 which is using this second audio contents data 82 reaches the end of the branching tree, the user is invited to download data consisting of a branching tree program and audio contents. And, when the user performs actuation, the second branching tree program 72 and the third audio contents data 83 are downloaded by the tree downloading program 61, and then the second branching tree program 72 is executed. At a time point when the second branching tree program 72 has been executed up to partway through its branching tree, the user is invited to download data consisting of audio contents for continuing the game. When, by actuation by the user, the fourth audio contents data 84 is downloaded, which is data for continuing the game, the game is resumed from partway through the branching tree, and the story of the game terminates at the time point that the end of the branching tree of the second branching tree program 72 is reached.

Thus, according to this embodiment, it is possible to perform deployment of the next data files for the game by the simple actuation of selection between alternatives, so that it is possible to make the game progress.

Furthermore, since according to this embodiment it is possible to substitute and utilize only the data files which are used in the game, accordingly it is possible to utilize substituted data files without changing the program.

Furthermore, according to this embodiment, by storing only the data files which are immediately required upon the mobile communication terminal upon which the program is executed, along with it being possible to reduce the cost and the time entailed by downloading data files, also it is possible to economize upon the storage region of the mobile communication terminal.

It should be understood that, in this embodiment, although it was arranged for data consisting of audio contents or the like to be downloaded, it would also be acceptable to arrange to acquire such data via a memory card or the like, and it would also be acceptable to terminate the story without newly acquiring any data.

Furthermore although, in this embodiment, it was arranged to delete the second audio contents data 82 when downloading the second branching tree program, it would also be acceptable, even when the branching tree program has been downloaded, not to delete a portion, or all, of the audio contents data, and to utilize it in the branching tree program which has been downloaded.

Furthermore although, in this embodiment, the game was supposed to be played by replaying audio, it would also be acceptable to provide a program which is used for a game consisting of characters, still images, or moving images, or in a game in which these are combined together.

Furthermore although, in this embodiment, it was supposed that the program was described in a language such as so called JAVA (registered trademark) or the like which can be used generally and is not dependent upon a portable telephone as a terminal, it would also be acceptable for the program to be described in some other programming language.

Furthermore although, in this embodiment, a portable telephone was used as the mobile communication terminal, it would also be acceptable for this to be some other type of mobile communication terminal.

As has been explained above, the program and the mobile communication terminal of the present invention can be applied to a mobile communication terminal which is capable of deploying contents such as images, audio, or documents or the like.

What is claimed is:

1. A mobile communication terminal, usable by a user, comprising an input device and a processor running a game application, the game application including a program, the program including branching tress which controls deployment of data in the game application, wherein the program includes the steps of:
   replaying first audio data;
   thereafter, accepting a user selection of alternatives and replaying the first audio data in the branching tree which selected; and
   repeating the steps of replaying and accepting; wherein,
   if the end of one of the branching trees is reached, or , if a next time of audio data is not stored in the mobile communication terminal, then downloading second audio data or a required program from a server device,
   wherein a first branching tree replaces the file names which are included in the second audio contents data with audio data items corresponding thereto; and
   continuing the game.

* * * * *